(No Model.)
R. W. ALEXANDER.
CORN PLANTER CHECK ROWER.
No. 256,610. Patented Apr. 18, 1882.
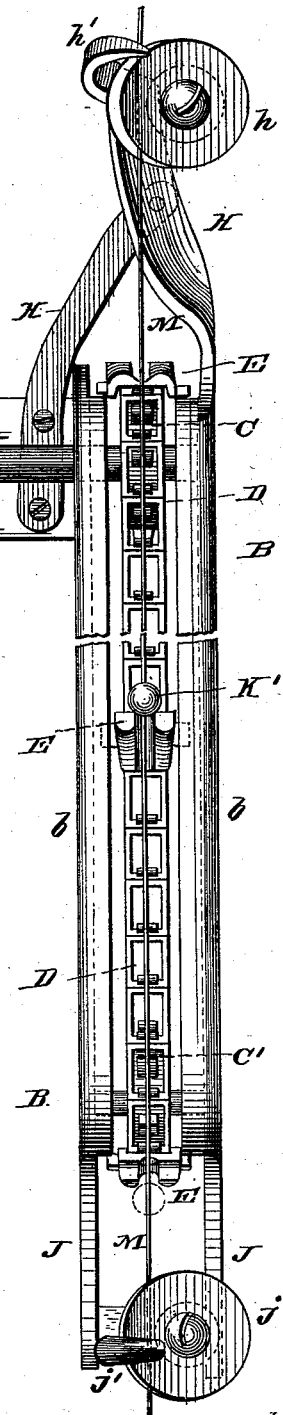
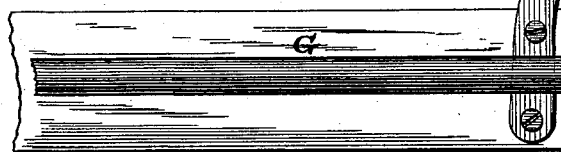
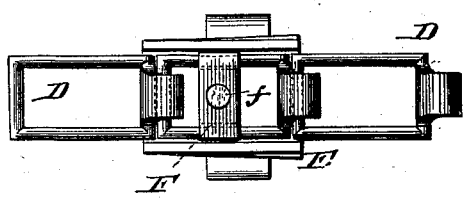
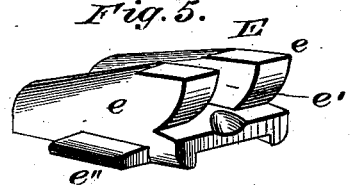
WITNESSES
Fred. G. Dieterich.
F. C. Dieterich.
INVENTOR:
Ralph W. Alexander,
By W. P. Richards,
Attorney.

(No Model.) 2 Sheets—Sheet 2.
R. W. ALEXANDER.
CORN PLANTER CHECK ROWER.
No. 256,610. Patented Apr. 18, 1882.
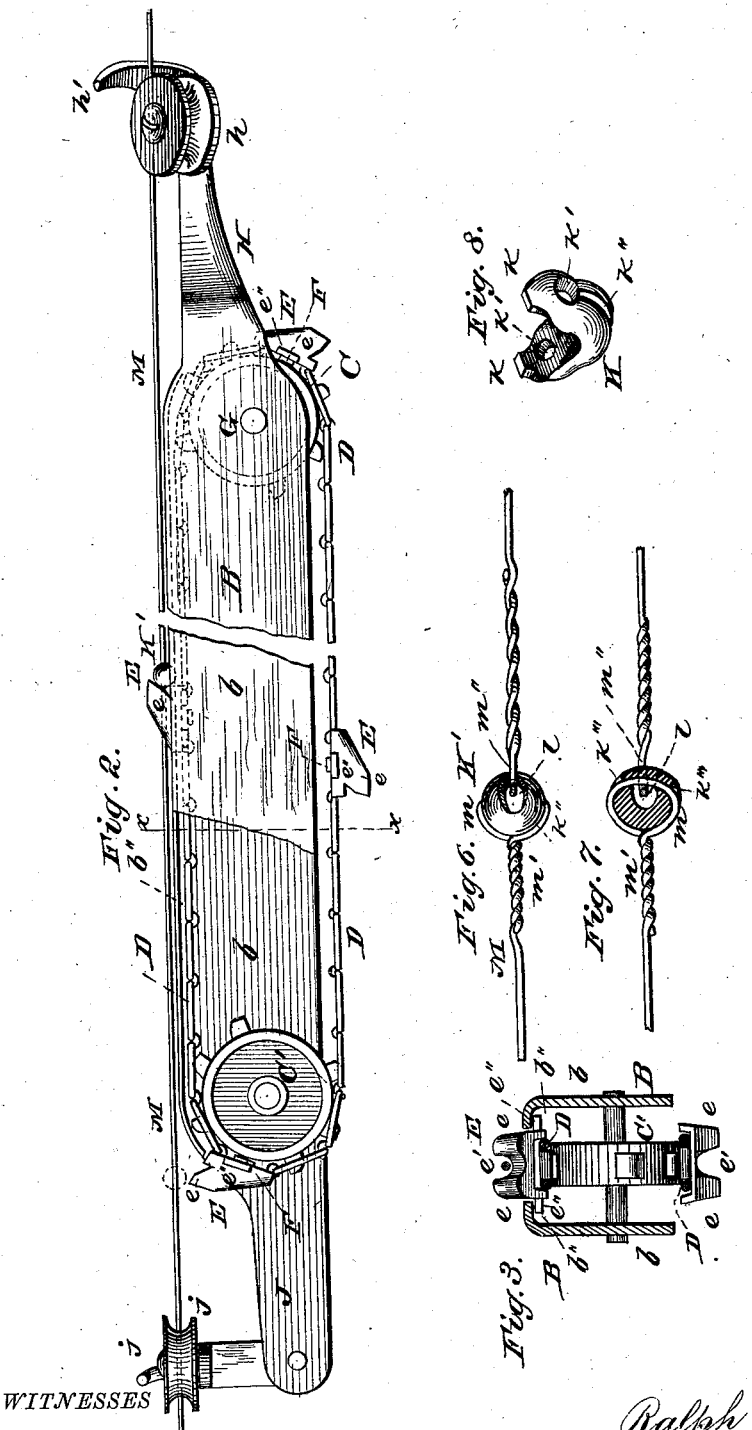
WITNESSES
Fred. G. Dieterich
P. C. Dieterich
INVENTOR
Ralph W. Alexander,
By W. B. Richards,
Attorney.

UNITED STATES PATENT OFFICE.

RALPH W. ALEXANDER, OF GALESBURG, ILLINOIS.

CORN-PLANTER CHECK-ROWER.

SPECIFICATION forming part of Letters Patent No. 256,610, dated April 18, 1882.

Application filed January 26, 1882. (No model.)

*To all whom it may concern:*

Be it known that I, RALPH W. ALEXANDER, a citizen of the United States, residing at Galesburg, in the county of Knox and State of Illinois, have invented certain new and useful Improvements in Corn-Planter Check-Rowers, of which the following is a specification, reference being had therein to the accompanying drawings.

This invention relates to improvements in corn-planter check-rowers of that class which are actuated by knots or tappets on a tappet-wire which is stretched over the ground to be planted.

In check-rowers of this class as heretofore constructed the tappets on the stretched wire have, as a means of transmitting motion to the seed-slides of the planter, acted directly upon forked arms or levers, or sliding arms with forked heads; and the main feature of my invention consists in the use of forked heads on endless belts, which forked heads and endless belts receive motion from the tappet-wire and impart movement to the seed-slides.

The invention further consists in constructions and combinations hereinafter described, and set forth in the claims annexed.

In the accompanying drawings, which illustrate my invention, and in which the same reference-letter indicates the same part in the different figures, Figure 1 is a top plan. Fig. 2 is a side elevation, partly broken away to show the working parts; Fig. 3, a sectional elevation in the line $xx$ in Fig. 2; Fig. 4, a detail; Fig. 5, a detail. Fig. 6 is a plan of the tappet-wire and one tappet. Fig. 7 is a sectional plan of the tappet and plan of the wire. Fig. 8 is a perspective of the blank from which the tappet is formed.

Referring to the drawings by letters, letter A represents one end of a bar to which the check-row devices are secured, and which may be mounted on the planter in any ordinary manner.

B is a frame, formed of two parallel bars, $b$ $b$, secured to the end of the bar A. C C' are sprocket-wheels journaled between the bars $b$ $b$ a short distance apart.

D is a chain-belt arranged over the sprocket-wheels and geared therewith. Heads E are secured to the belt D at suitable distances apart. Each head E has a perpendicular, or nearly perpendicular, side, $e$, and a groove, $e'$, in its upper side, so as to constitute it what may be termed a "forked head." The heads E are attached to the links of the chain-belt by a bolt, $f$, which passes through the head and through a bar, F, which extends across and below the side bars of the link, as shown at Fig. 4, which is a plan of a head, E, and link, (seen from below.) The heads E may be attached to the chain-belt in other ways than herein described, if preferred. Lugs $e''$ project laterally from the heads E and slide in grooves $b''$ in the upper and confronting sides of the bars $b$ $b$, and serve to hold the heads E and chain-belt from rising when engaged with the tappets, as hereinafter described.

G is a shaft journaled in suitable bearings on the bar A. One end of the shaft G is connected with the sprocket-wheel C, so as to be rotated therewith. The shaft G may be connected with either sprocket-wheel, and may be provided with any ordinary means for transmitting motion therefrom to the seeding devices of the planter.

Standards H project forward from the frame B and carry at their forward ends ordinary guide-pulley $h$ and guide-finger $h'$ for the tappet-wire, and standards J project rearwardly from the bars B and carry ordinary guide-pulley and finger $j$ $j'$.

Any ordinary tappet-wire may be used with my check-rower hereinbefore described; but my present invention embraces an improvement in the construction of the tappets and method of securing them to the wire, which I will proceed to describe as follows:

Fig. 8 shows the form of the malleable-iron blank K as cast or molded with a hole, $k'$, in each branch or end $k$ and a groove, $k''$, extending from each hole $k'$ toward the other hole. The branches $k$ are pressed together to form a sphere, K', of the blank K, as shown at Fig. 6, and their outer ends meet, so as to leave a hole, $l$, transversely to the hole $k'''$, formed by the two holes $k'$, which are brought into line inclosing the branches $k$, as described. The wire M is formed in sections, united at each tappet by passing one end of a section through the hole $k'''$ and bending it to form an eye, $m$, as shown in the drawings, which is held in place by coiling or twisting the wire, as at $m'$. The end of an adjacent section is then passed through the hole $l$ and eye $m$ and bent to form an eye, $m''$, which is also held by coiling, as shown. The outer part of the eye $m$ rests in the grooves $k''$ in the tappet, and said eye is so located that it receives the eye $m''$ and the wear therefrom and prevents the eye $m''$ being drawn against the interior side of the hole $k'''$ when the wire is stretched.

In operation, in planting corn the planter is drawn along the stretched tappet-wire in the ordinary manner, and said wire is guided by the guide pulleys and fingers, so that it rests in the grooves $e'$ in the heads E. A tappet coming in contact with the face $e$ of the head E, as shown by full lines at Fig. 2, will force said head E rearward to the planter until the moving belt D turns said head E over the rear sprocket-wheel, C', and allows the tappet to escape from contact with the head E, as indicated by dotted lines at same figure. The movement of the head E last described will, through the instrumentality of the chain-belt and sprocket-wheel C, impart a partial rotation to the shaft G, and thereby give a throw to the seed-slides of the planter and cause them to drop a charge of seed. The heads E are arranged at such distances apart that when one has passed into position to allow a tappet to escape therefrom, as hereinbefore described, another head E will be brought into position for the action of the next succeeding tappet, and thus an intermittent rotary movement will be imparted to the shaft G and seed dropped at distances between the deposits thereof corresponding to the distances between the tappets on the wire M.

Duplicates of the frame B, chain-belt, and connected devices are connected with the other end of the shaft G and bar A for operation when the planter is turned round to traverse the wire M in the opposite direction in the ordinary manner.

The frame B may be differently constructed from what I have shown and described, and the chain-belt may be of any suitable or desirable kind, and other means than I have herein shown and described may be used in imparting movement from the belt to the seed-slides.

What I claim is—

1. In a check-rower, the combination, substantially as described, with a tappet-wire, of a belt provided with forked heads adapted to receive motion from the tappet-wire and to impart movement to the seed-slides of the planter through suitable connecting mechanism.

2. A belt having forked heads carried on sprocket-wheels or pulleys and adapted to impart movement to planter seed-slides, in combination, substantially as described, with a wire having tappets adapted to act on said forked heads by contact therewith.

3. In a check-rower, in combination with an actuating tappet-wire, a belt mounted on pulleys or sprocket-wheels and provided with forked heads which move with the belt, whereby the action of one tappet on the wire upon one of the forked heads will move and bring another forked head into position for the action of a succeeding tappet, substantially as described, and for the purpose specified.

4. In combination, the belt mounted on pulleys or sprocket-wheels and provided with forked heads E, tappet-wire, guide-pulleys for the tappet-wire, and means for transmitting motion from the belt to the planter seed-slides, substantially as and for the purpose specified.

5. The belt D, having forked heads E, adapted to be actuated by a tappet-wire, sprocket-wheels C C', in combination with the shaft G, to which said belt imparts an intermittent rotary motion, whereby said shaft may impart movement to the planter seed-slides with intervals of rest between each movement of said seed-slides.

6. In combination with the belt having heads E, with side ledges, lugs, or projections, $e''$, and the sprocket-wheels, the side frame-bars, $b\ b$, having grooves $b''$, in which the ledges $e''$ slide to hold the belt from rising while a forked head is in contact with a tappet on the wire, substantially as and for the purpose specified.

7. A tappet for corn-planter check-row tappet-wires formed of a blank, K, with holes $k'$, which holes form a hole, $k'''$, transverse to the hole $l$, both formed by closing the blank, substantially as and for the purpose specified.

8. In combination with sections of wire having interlocking eyes $m\ m''$, a tappet-ball having holes $l$ and $k'''$, transversely to each other and adapted to receive said eyes on the sections of wire, substantially as and for the purpose specified.

In testimony whereof I affix my signature in presence of two witnesses.

RALPH W. ALEXANDER.

Witnesses:
HARRY M. RICHARDS,
SAML. N. GROSE.